Figure 1:
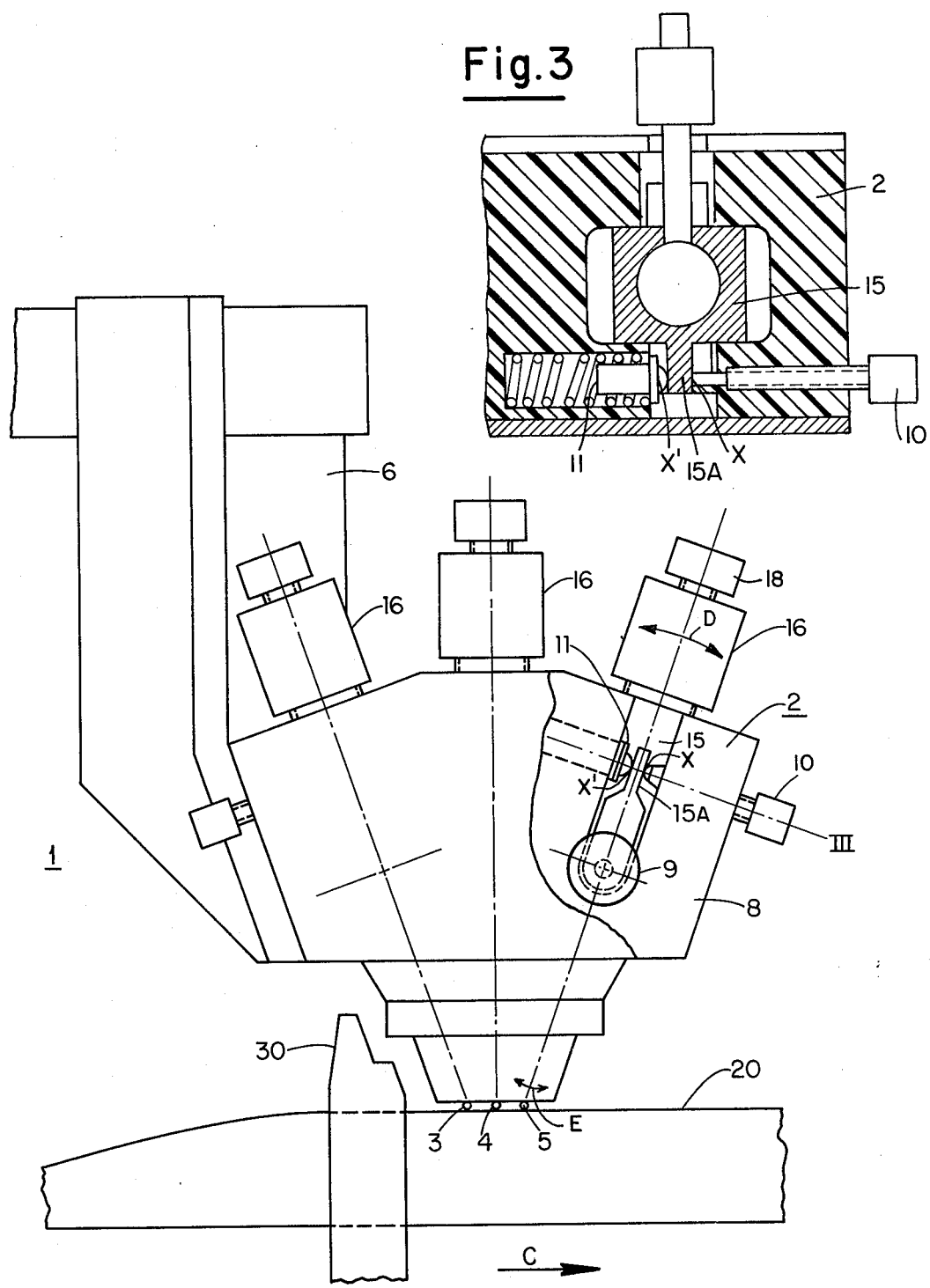

United States Patent [19]

Roderburg et al.

[11] 3,931,489

[45] Jan. 6, 1976

[54] MULTIARC SEAM WELDING APPARATUS FOR THIN METAL SHEET

[75] Inventors: Harold Roderburg, Langenhagen; Gert Nordmann, Hannover, both of Germany

[73] Assignee: Kabel-und Metallwerke Gutehoffnungshuette Aktiengesellschaft, Germany

[22] Filed: May 21, 1975

[21] Appl. No.: 579,336

Related U.S. Application Data

[63] Continuation of Ser. No. 412,812, Nov. 5, 1973, abandoned.

[52] U.S. Cl. ............................ 219/60 R; 219/124
[51] Int. Cl.² ........................................ B23K 9/02
[58] Field of Search ............ 129/124, 175, 60 R, 61, 129/130, 137; 72/176

[56] References Cited
UNITED STATES PATENTS

| | | | |
|---|---|---|---|
| 2,436,387 | 2/1948 | Hautcv et al. ............... | 219/137 PS |
| 2,518,289 | 8/1950 | Cox ............................... | 219/124 X |
| 3,253,117 | 5/1966 | Buems ........................... | 219/124 |
| 3,278,720 | 10/1966 | Dixon ........................... | 219/125 X |
| 3,280,609 | 10/1966 | Lehneut et al ................ | 72/176 |
| 3,349,213 | 10/1967 | Gorman ......................... | 219/124 X |
| 3,462,579 | 8/1969 | Meisteu et al. ............... | 219/125 |
| 3,544,752 | 12/1970 | Lehneut et al ................ | 219/61 X |
| 3,748,426 | 7/1973 | Stauley ......................... | 219/125 |

*Primary Examiner*—Bruce A. Reynolds
*Attorney, Agent, or Firm*—Marn & Jangarathis

[57] ABSTRACT

Apparatus for welding adjacent longitudinal edges of a thin flat workpiece being formed into a tubular configuration is disclosed as comprising a single welding head and an associated welding head bracket including pivot means and vertical adjustment means for selectively positioning the welding head above the moving workpiece. The single welding head includes three welding electrodes having their welding tips disposed in spaced linear arrangement in the direction of the moving workpiece, and being adapted to individually receive electric power for the generation of separate welding arcs. Associated with each of two of the three welding electrodes is a tilt adjustment means for individually adjusting the alignment of such two electrodes during welding operation so that the welding baths created by such two said welding electrodes overlap the welding bath created by the centrally positioned third electrode. The single welding head is configured to be closely disposed to the output side of a forming station for the thin flat workpiece so that the seam of the tubular configuration formed may be welded prior to seam separation due to material resilience.

3 Claims, 3 Drawing Figures

MULTIARC SEAM WELDING APPARATUS FOR THIN METAL SHEET

This is a continuation of application Ser. No. 412,312, filed Nov. 5, 1973, abandoned.

The invention relates to a multiarc apparatus for welding together thin strips or sheets as they pass under a stationary welding head, and in particular for welding under an inert gas shield the longitudinal edges of a strip or sheet of metal shaped to form a tube.

In producing welded seams in the presence of an inert gas shield, use has been made of multiarc apparatus to improve the quality of the welded seam and to increase the rate of formation of such welded seam. For example, as shown in U.S. Pat. No. 3,242,309, several nonconsumable welding electrodes may be mounted in a single holding means. Such holding means is formed of copper block or plates separated from each other by suitable insulation. The electrodes are cooled by a common water circulating system and the holding means is provided with conduits for supplying protective gas such as argon to the electrodes and the welding area. The use of this type of multiarc welding apparatus for producing welded seams has however, led to some difficulties, particularly when forming welded seams in a thin metal strip or sheet to convert the same to tubular form. Thus for instance, when a metal strip or sheet is formed into a tube whose seam must be welded, it is vital that the welding electrodes be exactly positioned relative to each other and with respect to the adjacent edges of the metal strip or sheet forming the seam to insure precision welding while the material being welded moves past the welding station at high speed. However, this precise positioning of the welding electrodes can not be easily achieved with the single holding means described.

A further example of known multiarc welding apparatus for the edges of a strip of metal being formed into a tube is depicted in U.S. Pat. No. 3,544,752. A preferred embodiment of this apparatus may comprise three electrodes, each of which is positioned in a separate electrode holder that may be separately adjusted both in a vertical and horizontal direction. This arrangement enables the individual electrodes within the welding apparatus to be arranged in a manner to allow for precise adjustment of the same to suit seam welding conditions at any given time, including a correlation of the same with the particular metal being welded, compensation for burning-off at the electrode tips, variations in the longitudinal seam details, energy distribution to the electrodes and the like. The electrode holders are generally made from ceramic substances having a high thermal conductivity, which act to electrically insulate the electrodes and form a distinct housing for each electrode.

In the manufacture of copper and aluminum tubes little difficulty has been experienced in utilizing multiarc welding apparatus of the type described in U.S. Pat. No. 3,544,752 and when three electrode configurations are employed an increase in welding speed of up to three (3) times that available with single electrode structures may be achieved. However, when such multiarc welding apparatus is utilized to manufacture steel tubes from steel strips or ribbons, and especially steel ribbon with a wall thickness of less than 1.5mm, satisfactory welded seams accompanied by desireable feed rates have not been available. This occurs because such steel ribbon exhibits a greater resilience than aluminum or copper strips or ribbons, consequently, the longitudinal, which are to be welded of steel ribbon formed into a tube tend to spring back in accordance with the ribbon's prior flat configuration as the same moves beyond the last stage of the forming mechanism. Furthermore, in the utilization of multiarc welding apparatus of the type described above, in forming steel tubes, the electrode most remote from the last stage of the forming station, in the longitudinal direction of travel of the steel ribbon is structurally positioned at too great a distance from the last stage of the forming mechanism. This means that the welding arc of this electrode is positioned in an area where the longitudinal edges of the steel ribbon have a strong tendency to spring back and to thus separate before the seam is constrained. The last stage of the aforesaid forming mechanism may comprise a forming ring of the type depicted and described in conjunction with the preferred embodiment of the invention of U.S. Pat. No. 3,280,609.

Therefore, it is object of this invention to provide an improved multiarc welding apparatus appropriate for welding the longitudinal adjacent edges of thin wall steel strips or ribbons at relatively high speeds as the same are transformed from a flat to a tubular shape.

A further object of this invention is to provide improved multiarc welding apparatus having a plurality of electrodes which are positioned within a single welding head and may be precisely adjusted for correlation with the characteristics of the particular metal being welded.

Various other objects and advantages of the invention will become clear from the following detailed description of a preferred embodiment thereof and the novel features will be particularly pointed out in connection with the appended claims.

In accordance with the teaching of this invention, multiarc welding apparatus comprising three linearly disposed electrodes is provided wherein the two outer electrodes are tilted in the direction of the center electrode so that the welding tips of all three electrodes tend to converge both outer electrodes being pivotable toward and away from the welding tip of the central electrode so that during a welding operation such outer electrodes may be adjusted to cause the welding baths created by their welding arcs to overlap the welding bath of the central electrode. The multiarc welding apparatus according to the instant invention enables the welding bath of an electrode furthest removed from a forming mechanism to be positioned substantially closer to such mechanism than was previously available while additionally each of the electrodes is individually adjustable in the vertical direction within a single welding head.

Further, in accordance with the teachings of the present invention, it is especially advantageous to have a portion of each of the outer electrodes disposed about a deformable material and capable of rotation about a fixed axis located within said deformable material. The deformable material acts to provide an elastic support that enables each of the outer electrodes to be rotated a few degrees toward or away from the central electrode. An especially appropriate deformable material for this purpose is polytetrafluoroethylene.

Figure 2:
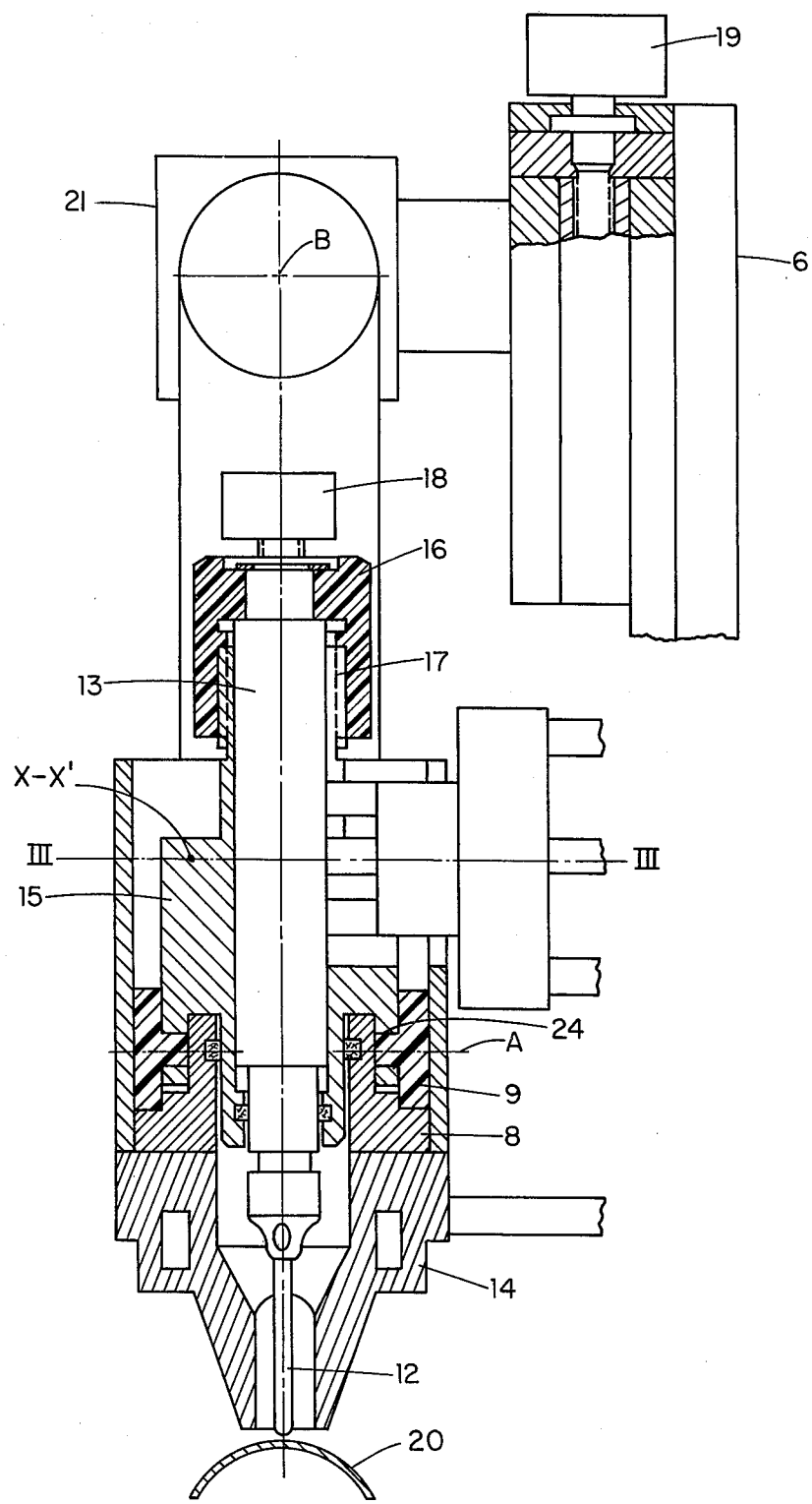

The invention will be more clearly understood by reference to the following detailed description of a preferred embodiment thereof in conjunction with the accompanying drawings in which:

FIG. 1 is a side elevational view partially in section of one form of the multiarc welding apparatus according to present invention, and schematically illustrates such apparatus operatively associated with a steel workpiece moving in a longitudinal direction through the last stage of a forming mechanism that converts a flat steel ribbon into a tubular configuration;

FIG. 2 is an enlarged side elevational view of the apparatus of FIG. 1 in section, showing in detail one of the two outer electrodes with associated components of such apparatus; and FIG. 3 is a sectional view taken through III—III in FIGS. 1 and 2 showing in detail the cross section of the electrode holder within one of the two outer electrodes as well as structural components associated therewith.

Referring to FIG. 1, there is depicted a steel workpiece 20 having a wall thickness which may be viewed for example, as less than 1.5mm, being longitudinally displaced in the direction indicated by the arrow past multiarc welding apparatus 1 according to the instant invention. The exemplary multiarc welding apparatus according to the instant invention comprises a welding head 2 having positioned therein welding electrodes 3, 4 and 5 whose welding tips are in spaced alignment in the direction of travel of the workpiece 20. The central welding electrode 4 is vertically orientated, while the outer welding electrodes 3 and 5 are each tilted from the vertical toward the central welding electrode 4 in the direction of the workpiece 20. The welding head 2 is connected to and supported by a welding head bracket 6 which provides an appropriate means for positioning the welding tips of the welding electrodes 3, 4 and 5 in alignment with the adjacent longitudinal edges of the workpiece 20 as it acquires a tubular configuration. In addition, the welding head bracket 6 is employed to position the welding head 2, as a unit, in close proximity to the output side of a forming ring 30 which may comprise the last stage of a flat strip-to-tube forming mechanism. As best shown in FIG. 2, the vertical positioning of the welding head 2 as a complete unit is provided by means of a set screw arrangement 19 incorporated within the welding head bracket 6 while the welding head 2 may be rotated as a unit about the point of attachment of the pivot assembly 21 of the welding head bracket 6. Because the welding electrodes 3 and 5 are each tilted toward the central welding electrode 4 in the direction of the workpiece 20, the portion of the welding head 2 in the vicinity of the welding tips is configured to permit the entire welding head 2 to be positioned significantly closer to the forming ring 30, for example by 16mm. This allows the welding bath produced by the welding arc of the most remote welding electrode 5 to be placed at a position where the longitudinal edges of the steel workpiece 20 are sufficiently constrained by the forming ring 30, notwithstanding the high resilience of the steel workpiece 1.

Welding head 2 comprises a plastic electrode housing 8 through which the welding electrodes 3, 4 and 5 extend, and within which the tilt alignment of the outer welding electrodes 3 and 5 may be precisely adjusted. Referring additionally to FIGS. 2 and 3, it will be seen that such adjustment is made available by the cooperation of a bearing 9, which is preferably made of polytetrafluoroethylene and has a trunnion portion 24 each of the welding electrodes 3 and 5 is adapted to rotate, and set screw 10 and an opposing prestressed spring 11 adapted to engage at location X—X' opposite sides of an extended upper portion 15A of an electrode holder 15 encompassing each of the outer welding electrodes 3 and 5. The cross-section of the electrode holder 15 is best seen in FIG. 3 which is a sectional view through axis III—III. It will be appreciated that the setting of set screw 10 which engages the extended portion 15A of the electrode holder 15 at point x will cause the electrode holder 15 to pivotally displace about trunnion 24 to thereby control the tilt of the outer electrodes 3 and 5.

Referring to FIGS. 2 and 3 there is illustrated in section the mechanisms associated with each of the outer electrodes 3 and 5. A welding tip 12 of welding electrode 3 or 5 is arranged to be held under tension by a holding vice 13 in such a manner as to permit the welding tip 12 to protrude slightly beyond a protective gas nozzle 14. The vise 13 is permanently fastened inside the electrode holder 15 which is rotatable about axis A of the bearing 9 and trunnion 24 by adjustment of the set screw 10.

In addition to the precise tilt adjustment of the welding electrodes 3 and 5, each of the electrodes 3, 4 and 5 may be longitudinally displaced along its longitudinal axis by means of a set screw 16, FIG. 1, which acts to axially adjust the vice 13 in the manner indicated by arrows D and E since the set screw 16 is positioned about the electrode holder 15 and engages same by means of a thread coupling 17. The vertical positioning of the welding head 2 as a complete unit is provided by means of a set screw arrangement 19 incorporated within the welding head bracket 6, while the welding head 2 may be rotated as a unit about the attachment point B of the pivot assembly 21 of the welding head bracket 6.

While this invention has been particularly shown and described with reference to a specific embodiment, it will be obvious to those skilled in the art that the foregoing and various other changes and modifications in form and details may be made without departing from the spirit and scope of the invention. It is therefore intended that the appended claims be interpreted as including all such changes and modifications.

What is claimed is:

1. Apparatus for welding a thin strip workpiece in motion and particularly for welding adjacent longitudinal edges of a moving metal strip workpiece being formed at a forming station into a tubular configuration, said apparatus including a welding head and welding head bracket means, said welding head bracket means including pivot means for rotating said welding head and vertical adjustment means for selectively positioning said welding head with respect to said workpiece; the improvement comprising:

first, second and third welding electrodes being similarly configurated and having their welding tips in a spaced linear arrangement along a common axis, said second electrode being disposed intermediate said first and third electrodes and positioned normal to said workpiece, said first and third electrodes being aslantly positioned with respect to said second electrode and inclined toward said second electrode in the direction of said workpiece;

first, second and third electrode holder means engaging said first, second and third electrodes, respectively for individually displacing each of said electrodes vertically toward and away from said workpiece; and first and second tilt adjustment means coupled to said first and third electrode holder means, respectively, for individually adjusting the inclination of said first and third electrodes to permit the welding tips of each electrode to be closely disposed to an adjacent welding tip along said common axis and cause the welding baths created by said first and third electrodes during a welding operation to overlap the welding bath created by said second electrode;

said welding head having an exterior portion thereof proximate said first electrode configured to closely follow the inclination of said first electrode to enable said welding head to be closely positioned to said forming station and thereby place the welding bath generated by said third electrode at a position wherein said longitudinal edges of the workpiece are sufficiently constrained by said forming station.

2. Apparatus in accordance with claim 1, wherein said first tilt adjustment means comprises a deformable bearing means coupled to a central portion of said first holder means for rotational movement of the latter.

3. Apparatus in accordance with claim 2, wherein said deformable bearing means is comprised of polytetrafluoroethylene.

* * * * *